United States Patent Office 3,573,220
Patented Mar. 30, 1971

3,573,220
LIQUID SCINTILLATOR COMPOSITIONS FOR
COUNTING THERMAL NEUTRONS
Royal H. Benson, Texas City, Tex., assignor to Monsanto
Company, St. Louis, Mo.
No Drawing. Continuation-in-part of application Ser. No.
720,451, Apr. 11, 1968. This application Feb. 4, 1969,
Ser. No. 796,603
Int. Cl. C09k 1/00; F21k 2/02; G01t 1/20
U.S. Cl. 252—301.3     17 Claims

ABSTRACT OF THE DISCLOSURE

A scintillator composition for liquid scintillation counting and detection of thermal neutrons comprising (1) a scintillator solution comprised of an aromatic hydrocarbon solvent, a scintillation solute and an ethoxylated alkyl phenol, and (2) a loading agent comprised of an aqueous solution of a compound of an element having high thermal-neutron-capture efficiency, said element interacting with such neutrons resulting in the production of an exo-ergic nuclear reaction.

CROSS REFERENCE TO RELATED APPLICATION

This is a continuation-in-part of copending application Ser. No. 720,451 filed Apr. 11, 1968.

BACKGROUND OF THE INVENTION

The present invention relates to liquid scintillation counting. More particularly, the present invention relates to an improved composition and process for the liquid scintillation counting and detection of thermal or slow neutrons.

In recent years, liquid scintillation counting of radiation has become a very popular industrial and research tool. Briefly, the liquid scintillation counting technique involves the interaction of radiation, usually with organic molecules, resulting in the emission of light pulses by the organic molecules, the light pulses being proportional to the amount of radiation. The light pulses are counted using suitable equipment and by this technique the radiation level determined. Generally, the liquid scintillator used in the liquid scintillation counting process consists of a fluor dissolved in an aromatic solvent. While such scintillators are suitable for the measurement of low-energy beta emitters such as $C^{14}$, $S^{35}$ and $H^3$, they are not suitable for the detection of thermal or slow neutrons for the reason that such neutrons when absorbed by the carbon, hydrogen and oxygen atoms normally found in such organic scintillators do not produce scintillation light pulses. This problem has been overcome to some extent by the addition of boron$^{10}$-containing compounds to the scintillator solution. Boron$^{10}$ has a sufficiently high cross-sectional area for neutron reactions such that the thermal neutrons are efficiently absorbed by it resulting in the emission of alpha particles. The alpha particles in turn interact with the liquid organic scintillator to produce scintillation light which is then detected as described above. Unfortunately, since the scintillator solutions are organic in nature it is necessary to use organo-boron compounds in order to achieve these "loaded" solutions. Organic boron compounds are generally quite expensive to prepare, frequently very toxic and difficult to handle and oftentimes it is still not possible to have a high enough concentration of the boron$^{10}$ present to insure adequate absorption of the neutrons.

SUMMARY OF THE INVENTION

In the above referred to copending application, there is disclosed a liquid scintillation counting composition to which can be added a neutron-capture solute often called a "loading agent." It has now been discovered that the liquid scintillation composition disclosed in the above-identified application when combined with certain loading agents produce safe, inexpensive compositions which are excellent for the counting and detection of thermal neutrons and are particularly valuable for very large volume neutron detecting systems.

It is, therefore, an object of the present invention to provide an improved liquid scintillator composition for the counting and detection of thermal neutrons, said composition having very high neutron detection efficiency.

It is also an object of the present invention to provide a composition for the liquid scintillation counting and detection of thermal neutrons which is easier to prepare than prior art compositions, relatively inexpensive and safe.

Still a further object of the present invention is to provide an improved method of scintillation counting and detecting thermal neutrons.

Additional objects will become apparent from the description given herein and the appended claims. The present invention in one of its embodiments is a composition for use in liquid scintillation counting of slow neutrons comprising at least 30 percent by weight of a scintillator solution, said scintillator solution comprising an aromatic hydrocarbon solvent, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67; and a loading agent, said loading agent comprising an aqueous solution of a compound of an element having a sufficiently large neutron capture cross-section to effect absorption of thermal neutrons, said element being one which upon capturing a thermal neutron undergoes an exo-ergic nuclear reaction.

In another embodiment, the present invention provides an improvement in a liquid scintillation counting process for the detection of slow neutrons wherein a loading agent is added to a scintillator solution comprised of an aromatic hydrocarbon solvent, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67; and a loading agent comprised of an aqueous solution of a compound of an element as defined above.

DESCRIPTION OF THE PREFERRED EMBODIMENTS

The compositions of the present invention are comprised of two basic parts, the scintillator solution and the loading agent. The scintillator solution in general contains an aromatic solvent, an ethoxylated alkyl phenol and a scintillation solute while the loading agent is an aqueous solution of compounds of certain elements.

The ethoxylated alkyl phenols useful in preparing the scintillator solution can be depicted structurally as follows:

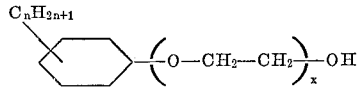

wherein $n$ is from 7 to 16 and $x$ represents the average number of ethylene oxide groups per molecule. The value of $x$ will, of course, vary depending on the number of carbon atoms in the alkyl substituent. In general, however, the value of $x$ will be such that the value of $n/x$ will be from 0.83 to 1.67. Examples of suitable ethoxylated alkyl phenols and preferred ranges of $n/x$ include ethoxylated heptyl phenol having a range of from 0.83 to 1.08, ethoxylated octyl phenol having a range of from 0.83 to 1.11, ethoxylated nonyl phenol having a range of from 0.89 to 1.11, ethoxylated decyl phenol having a range of from 0.90 to 1.17, ethoxylated hendecyl phenol having a range of from 0.93 to 1.22, ethoxylated dodecyl phenol having a range of from 0.93 to 1.27, ethoxylated tridecyl phenol having a range of from 0.97 to 1.34, ethoxylated tetradecyl phenol having a range of from 1.08 to 1.55, ethoxylated pentadecyl phenol having a range of from 1.15 to 1.67 and ethoxylated hexadecyl phenol having a range of from 1.33 to 1.51. As above stated, $x$ represents an average number of ethoxy groups per molecule. Thus, for example, when speaking of an ethoxylated alkyl phenol having 10.0 ethoxy groups, there will be present molecules having both more and less than 10 ethoxy groups.

The ethoxylated alkyl phenols useful in the present invention as well as methods for their preparation are well known. Usually, the ethoxylated alkyl phenols are prepared by condensing ethylene oxide with the desired alkylated phenol. It is generally preferred for the ethoxylated alkyl phenols of the present invention to be comprised mainly, that is, above 50% of the para form. However, it is especially preferred to use those in which at least 80% of the ethoxylated alkyl phenol is in the para form with the remainder being substantially comprised of the ortho form.

The solvents generally found to be useful in preparing the scintillator solution are the liquid aromatic hydrocarbons. Non-limiting examples of the later include benzene, toluene, o-, m-, p- xylenes and mixtures thereof, cumene, the ethylbenzenes and mesitylene. In particular, xylene, toluene and ethylbenzene have been found to give the highest counting efficiency. Especially preferred solvents are the xylenes, i.e., the ortho, meta or para isomers either alone or mixed. The volume ratio of solvent to the ethoxylated alkyl phenol useful in preparing the scintillation solution will generally be from 3:1 to 1:1. The ratio used will be determined by the sample stability requirements, the temperature at which the samples are measured, the counting efficiency requirements and the percentage of sample desired to be measured. The most useful ratios of solvent to ethoxylated alkyl phenol range from 2.4:1 to 1.6:1.

The scintillation solutes which may be used in preparing the scintillator solution are those which are well known in the art and the present invention is not to be construed as limited to the use of any particular scintillation solute. These scintillation solutes may be comprised of only a flour or may also contain a secondary solute such as a spectrum shifter or wave-band shifter. Some of the more well known fluors which are useful in the present invention are those selected from the group consisting of p-terphenyl, the oxazoles and the oxadiazoles. Probably the best known oxadiazole flour is PBD [2-(4-biphenylyl)-5-phenyl-1,3,4-oxadiazole] and the most well known oxazole flour is PPO [2,5-diphenyloxazole]. Some of the better known secondary solutes which may be combined with the foregoing primary solutes are POPOP [1,4-bis-2-(5-phenyloxazolyl) - benzene], alpha-NOPON [p-bis-2-(5,1-naphthyloxazolyl)-benzene], DPH [1,6-diphenyl - 1,3,5 - hexatriene], and alpha - NPO [2-(1-naphthyl)-5-phenyloxazole]. Another scintillation solute which has been mentioned in the prior art is m-terphenyl plus 0.5% anthracene. The scintillation solutes need only be present in amounts sufficient to enable the compositions of the present invention to be useful as liquid scintillators. The optimum amount will vary according to the particular component or components making up the scintillation solute and the amount will generally be a balance between cost, solubility, and performance requirements. The scintillation solute will generally be present in amounts of from 0.5 to 50 grams per liter but more often will be present in amounts from 1 to 12 grams per liter. It is especially preferred that the scintillator solutions of the present invention contain about 4 to 6 grams per liter of scintillation solute. When speaking of only primary solutes or fluors, these are generally present in amounts of about 0.5 to 12 grams per liter of the scintillator solution. Secondary solutes are generally present in relatively small amounts as compared to the fluors, that is, from about 0.05 to 3 grams per liter. The preferred scintillation solute of the present invention is comprised of PPO and POPOP.

The scintillator solution will comprise at least 30% by weight and preferably from 40 to 99% by weight of the total scintillator composition.

The compounds chosen to prepare the loading agents of the present invention should ideally be compounds of elements having high atomic density, low atomic number and exhibiting strong neutron interaction resulting in a single measurable physical event, i.e., an exo-ergic nuclear reaction. Such a reaction typically results in the emission of (1) some ionizing radiation such as gamma rays, or (2) an energy particle such as an alpha particle. An example of the neutron reactions involved upon neutron capture by an element having good neutron capture characteristics is shown in the following equation involving boron[10].

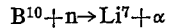

$$B^{10} + n \rightarrow Li^{7} + \alpha$$

The alpha particles produced then interact with the organic scintillator to produce scintillation light and can be detected with nearly 100% efficiency. Preferably, the uompound chosen will be a water-soluble one of an element selected from the group consisting of boron[10], lithium[6], cadmium[113], gadolinium[155], gadolinium[157], samarium[149] and samarium[151] water-soluble compounds of boron[10] and lithium[6] being especially preferred.

Practically any water-soluble compound of the above elements can be employed. Non-limiting examples include sodium and lithium borate, boric acid, boron fluoride, lithium acetate, lithium bromide, lithium nitrate, lithium carbonate, the acetate, chloride and bromide of samarium, the acetate, bromide and iodate of cadmium, and other such compounds.

In preparing the loading agents of the present invention, it is preferable to have the water-soluble compound of the particular element present in a relatively high concentration to insure maximum neutron capture and, consequently, high detection efficiency. It is to be understood that relatively low concentrations of the compound in the loading agent can be employed. For example, an aqueous solution containing as little as 1% by weight of the compound chosen will give satisfactory results. The amount of the compound in the loading agent will to some extent be dependent on the water solubility thereof. Generally, however, loading agents are employed which contain, by weight, from 10 to 90% of the maximum amount of the compound, also by weight, soluble in water at the temperature at which the scintillator composition is to be used.

The loading agent, depending on the particular compound used, is present in the composition of the present invention in amounts ranging up to 70 but preferably from 1 to 60% by weight.

I preparing the compositions herein, the scintillator solution and the loading agent are simply mixed together until a clear or translucent solution or gel is obtained. While the scintillator solution, the water and the water-soluble compound, the latter two going to make up the loading agent, can all be mixed simultaneously, it is preferred to first prepare the loading agent by dissolving the compound in water followed by adding the aqueous solution, i.e., the loading agent, to the scintillator solution. In order to illustrate the invention further, the following examples are presented.

EXAMPLE 1

A series of scintillator solutions was prepared using various ethoxylated alkyl phenols and xylene as a solvent. A volume ratio of xylene to the ethoxylated alkyl phenol of 1.7:1 was employed in all cases. Each scintillator solution prepared contained as the scintillation solute 0.55% (wt./vol.) of PPO and 0.01% (wt./vol.) of POPOP.

Loading agents were prepared by dissolving suitable compounds in water at room temperature.

The scintillator compositions for neutron detection were then prepared by mixing the above scintillator solutions with the loading agents. The table below gives the compositions of the scintillator solutions, the loading agents and the resulting scintillator compositions.

TABLE

| Scintillator composition | Scintillator solution | | | | Loading agent | | |
|---|---|---|---|---|---|---|---|
| | Parent phenol | Average No. of ethoxy groups/ molecule | $n/x$ | Wt. percent scintillator solution in scintillator composition | Compound | Percent wt. in $H_2O$ | Wt. percent loading agent in scintillator composition |
| 1 | Nonyl phenol | 9.460 | .95 | 50 | Lithium acetate | 50 | 50 |
| 2 | Dodecyl phenol | 10.0 | 1.2 | 60 | ____do____ | 50 | 40 |
| 3 | Nonyl phenol | 9.460 | .95 | 50 | Sodium tetraborate | 10 | 50 |
| 4 | Dodecyl phenol | 10.0 | 1.2 | 60 | ____do____ | 8 | 40 |
| 5 | Octyl phenol | 9.629 | 0.83 | 70 | Lithium chloride | 20 | 30 |
| 6 | Pentadecyl phenol | 9.0 | 1.67 | 40 | Cadmium nitrate | 15 | 60 |

All of the above scintillator compositions are used for the detection and counting of thermal neutrons. The efficiency of counting for the alpha particles produced from neutrons is found to be 100% in all cases, all of the compositions being either clear or translucent liquids or gels.

What is claimed is:

1. A scintillator composition for use in liquid scintillation counting of thermal neutrons comprising:
    at least 30% by weight of a scintillator solution, said scintillator solution comprising an aromatic hydrocarbon solvent, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, the volume ratio of said hydrocarbon solvent to said ethoxylated phenol in said scintillator solution being from 3:1 to 1:1, said solute being present in an amount of from 0.5 to 50 grams per liter of said scintillator solution; and
    a loading agent, said loading agent comprising an aqueous solution of a water-soluble compound of an element having a sufficiently large capture cross-section to effect absorption of thermal neutrons, said element being one which upon capturing a thermal neutron undergoes an exo-ergic nuclear reaction.

2. The composition of claim 1 wherein said element is one selected from the group consisting of boron[10], lithium[6], cadmium[113], gadolinium[155], gadolinium[157], samarium[149] and samarium[151].

3. The composition of claim 2 wherein said scintillator solution is present in an amount of from 40 to 99% by weight and said loading agent is present in an amount of from 1 to 60% by weight.

4. The composition of claim 3 wherein said aqueous solution contains, by weight, from 10 to 90% of the maximum amount of said compound, expressed as weight percent, soluble in water at the temperature at which said scintillator composition is to be used.

5. The composition of claim 4 wherein said compound is a compound of boron[10].

6. The composition of claim 4 wherein said compound is a compound of lithium[7].

7. The composition of claim 4 wherein the aromatic hydrocarbon solvent is xylene.

8. The composition of claim 7 wherein said scintillation solute is present in an amount of from 1 to 12 grams per liter of said scintillator solution and is comprised of a fluor and a wave band shifter.

9. The composition of claim 8 wherein said scintillation solute comprises 2,5-diphenyloxazole and 1,4-bis-2-(5-phenyloxazolyl)benzene.

10. The composition of claim 8 wherein said compound is a compound of boron[10].

11. The composition of claim 8 wherein said compound is a compound of lithium[7].

12. In a liquid scintillation counting process for the detection of thermal neutrons wherein a loading agent is added to a scintillator solution to increase the absorption of said neutrons, the improvement which comprises using a scintillator solution comprised of an aromatic hydrocarbon solvent, a scintillation solute and an ethoxylated alkyl phenol wherein the alkyl substituent contains from 7 to 16 carbon atoms and the ratio of the number of carbon atoms in said alkyl substituent to the average number of ethoxy groups in said ethoxylated alkyl phenol is from 0.83 to 1.67, the volume ratio of said hydrocarbon solvent to said ethoxylated phenol in said scintillator solution being from 3:1 to 1:1, said solute being present in an amount of from 0.5 to 50 grams per liter of said scintillator solution; and
    a loading agent comprised of aqueous solution of a water-soluble compound of an element having a sufficiently large capture cross-section to effect absorption of thermal neutrons, said element being one which upon capturing a thermal neutron undergoes an exo-ergic nuclear reaction.

13. The process of claim 12 wherein said element is one selected from the group consisting of boron[10], lithium[6], cadmium[113], gadolinium[155], gadolinium[157], samarium[149] and samarium[151].

14. The process of claim 13 wherein said scintillator solution is present in an amount of from 40 to 99% by weight and said loading agent is present in an amount of from 1 to 60% by weight.

15. The process of claim 14 wherein said aqueous solution contains, by weight, from 10 to 90% of the maximum amount of said compound, expressed as weight percent, soluble in water at the temperature at which said scintillator composition is to be used.

16. The process of claim 15 wherein said compound is a compound of boron[10].

17. The process of claim 15 wherein said compound is a compound of lithium[7].

References Cited

UNITED STATES PATENTS 2,755,253   7/1956   Muehlhause et al. ___ 252—301.2
3,372,127   3/1968   Thomas et al. _____ 252—301.2

TOBIAS E. LEVOW, Primary Examiner
A. P. DEMERS, Assistant Examiner

U.S. Cl. X.R.
250—83.1; 252—301.2; 260—613